June 3, 1924.
J. F. HENDRICKSON
CLAMP NUT AND JACK
Filed Feb. 17, 1923
1,496,630
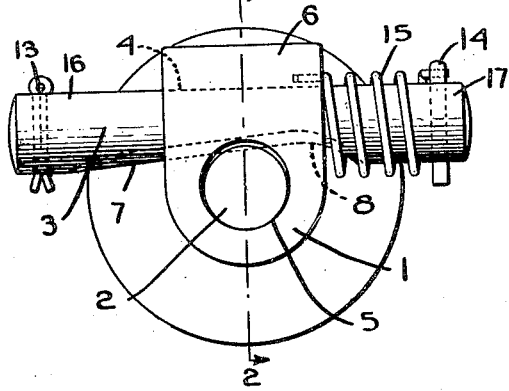
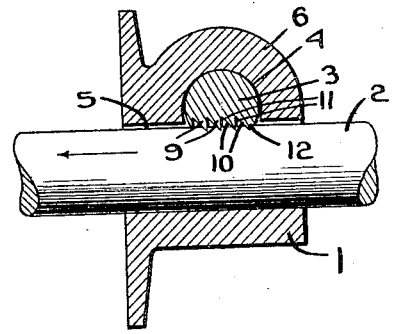
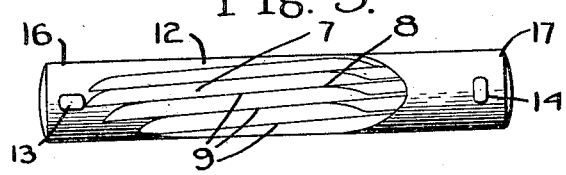
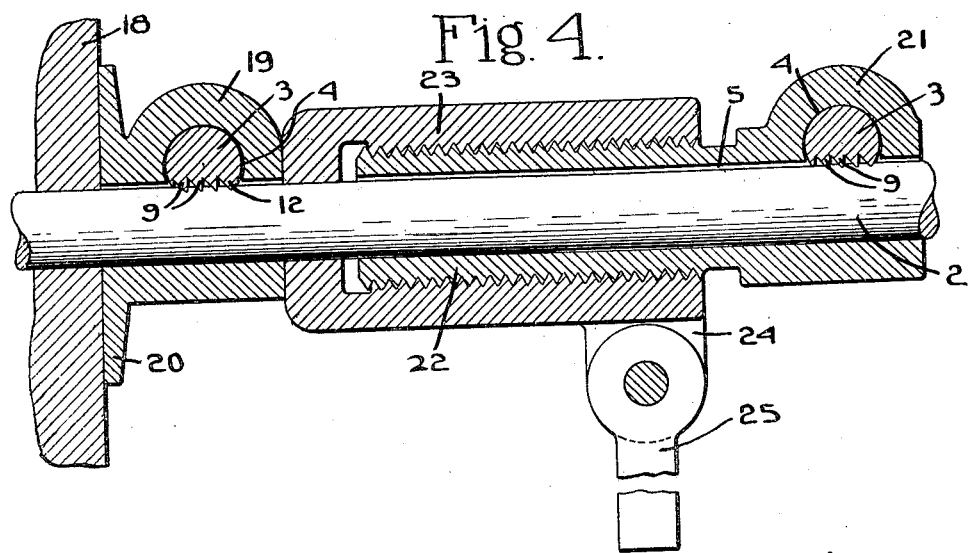
Inventor.
John F. Hendrickson
by Heard Smith & Tennant
Attys.

Patented June 3, 1924.

1,496,630

UNITED STATES PATENT OFFICE.

JOHN F. HENDRICKSON, OF ATLANTIC, MASSACHUSETTS.

CLAMP NUT AND JACK.

Application filed February 17, 1923. Serial No. 619,778.

*To all whom it may concern:*

Be it known that I, JOHN F. HENDRICKSON, a citizen of the United States, and resident of Atlantic, county of Norfolk, State of Massachusetts, have invented an Improvement in Clamp Nuts and Jacks, of which the following description, in connection with the accompanying drawing, is a specification, like characters on the drawing representing like parts.

This invention relates to a rod clamping device and the object thereof is to provide an extremely simple clamping device to take the place of the ordinary nut used in connection with a threaded rod.

One of the objects of the present invention is more particularly to provide a self-contained and unitary rod clamping device.

A further object of the present invention is to provide a rod clamping device which may be used on any rod of suitable size, whether threaded or unthreaded, to take the place of a nut.

A further object of the present invention is to provide a rod clamping device which may be easily and quickly released from one clamping position on the rod, moved along the rod to a new position, and there clamped.

A further object of the present invention is to provide a jack involving the principles of the clamping device which may be used for forcing the clamping device in a required position for clamping.

Other objects and features of the invention will more fully appear from the following description and accompanying drawings and will be particularly pointed out in the claims.

The drawings illustrate both in elevation and detail a preferred form of construction adapted for use in a rod clamping device and embodying the broad principles of the invention.

In the drawings:

Fig. 1 is an end elevation of the clamping device on the rod;

Fig. 2 is a section on line 2—2, Fig. 1 seen in the direction of the arrows;

Fig. 3 is a bottom view of the locking member;

Fig. 4 is an elevation showing two forms of the clamping device and the manner of using same.

The device illustrated is designed to be used on any rod threaded or unthreaded in place of a nut on a threaded rod and to be easily and quickly loosened from its clamped position on the rod and either moved to a new position or removed entirely therefrom. The device is particularly useful in exposed places where the threads on an ordinary threaded nut and rod would rust and fill with dirt necessitating a re-threading of both nut and rod every time they were used. Such an instance is in connection with the rods and nut used to hold the wooden forms while cement is being poured. The rods are only used temporarily and the threads become so filled with cement during the pouring thereof that it is very difficult to get the nuts off the rods in order to take the forms apart. The surplus rods and nuts which are not being utilized become so rusted and caked with cement that they must be re-threaded before they can be used and after a few re-threadings the nuts become so large and the rods so small that they are of no further service. The device illustrated may be used in connection with these old rods or with new ones which need not be threaded, and effectively take the place of the ordinary nut.

As illustrated herein the device consists of a collar 1 to fit and slide longitudinally on the rod 2 and a locking wedge-shaped member 3 co-operating with the collar and rod to force the contacting surfaces of the wedge member, collar and rod into such close frictional engagement that the collar will be firmly locked to the rod. An aperture 4 extends transversely of and intersects the central opening 5 through the collar. The aperture is formed through a raised portion 6 of the collar and the wedge member 3 is mounted for movement through the aperture with one portion, the flat wedging portion 7, projecting below the bottom of the aperture and into the central opening of the collar for frictional engagement with the rod as clearly shown in Fig. 2.

The wedge member is preferably of the form shown in the drawings with a long sloping wedging surface 7 cut at such an angle that when the member is driven into the collar a great force will be exerted by the wedging surface to hold the contacting surfaces of said member, collar, and rod in close frictional engagement. The wedging surface slopes to such a height at 8 that when the wedge member is driven to the left until the point 8 is directly above the rod, the wedge member is free from contact therewith and the whole clamping device is free to slide longitudinally along or to rotate about the rod. The wedge member preferably has teeth 9 cut thereon. The teeth are cut so that they present their sharp edges against the direction of the pull of the rod and it is preferred that they be cut as shown in the figures with a long sloping supporting surface 10 on that side of the tooth which is away from the direction from which the strain comes, and an upright surface 11, to force the tooth into the rod, lying on that side of the tooth on which the strain comes. The strain comes on the rod in the direction of the arrow, Fig. 2, and tends to rotate the wedge member in the direction of the arrow shown thereon, Fig. 2. In order to assist in firmly securing the wedge member to the rod a large tooth 12 has been formed on that side of the wedge member from which the strain comes, and as the strain is put on the rod and the wedge member rotates slightly, the large, sturdy tooth 12 will be driven into the rod to prevent the same from slipping through the collar. The teeth 9 have been cut at a slight angle to the longitudinal axis of the wedge member as shown in Fig. 3 in order to enable the large tooth 12 to extend practically the length of the wedging surface and to have its outer surface formed by the cylindrical periphery of the wedge member.

Some form of retaining means is preferably provided for anchoring the wedge member in the collar, and in the form in which the clamping device is now made, the retaining means are cotter pins 13 and 14 at the ends. A spring 15 serves to urge the wedge member into its wedging position and hold it with the flat wedging surface facing the opening through the collar while the clamping device is being put on the rod. Both of the ends 16 and 17 of the wedge member project beyond the collar to enable the member to be easily struck with a hammer when it is desired to either clamp the device on the rod or remove it therefrom.

In Fig. 4 two forms which the device may take have been shown used in conjunction with one another. The structure only partially shown at 18 may be the wall of a concrete form. One clamping device 19 of the type heretofore described and having an enlarged end 20 forming a face plate may be used next to the wall of the form. A clamp 21 of a slightly different form is shown as part of a jack. In this latter form of clamp the collar is extended to present an inner sleeve 22 having an opening of the same diameter as the opening through the collar with the outside of the sleeve threaded. An outer sleeve 23 is internally threaded for engagement with the external threads on the inner sleeve 22, and has one or more ears 24 projecting therefrom and a handle 25 for rotating the outer sleeve movably fastened to the ears. The clamp 21 together with inner and outer sleeves 22 and 23 thus co-operate to form a jack which may be used in setting up the wall 18. The two co-operating threaded sleeves 22 and 23 thus present a simple and effective form of a longitudinally extensible device by which great force may be exerted to force the clamping nut 19, for example, into position, and the sleeves together with the associated clamp form an extensible rod clamping device. While the sleeve 22 is shown integral with the collar it in effect abuts the collar in performing with the sleeve 23 this extensible function.

When the devices are in the position shown in the drawings they are clamped on the rod. If it is desired to remove the clamping device from the rod the wedge member 3 is given a sharp blow on the end 17 and driven toward the left until the point 8 is over the rod and the frictional engagement of the contacting surfaces of the locking member, collar, and rod, due to the wedging action is broken. The whole device is then free to be moved. When the clamping device has been moved to a new position and it is desired to fasten the device at that point the wedge member is given a few blows on the end 16 thereby driving the wedge member toward the right with the wedging surface tightly against the upper surface of the rod whereby the contacting surfaces of the wedge member, collar and rod will be forced into frictional engagement to lock the collar in position. The teeth on the wedge member will cut into the rod to form transverse ribs, or if the rod already has transverse ribs or threads the teeth will engage with such ribs to retain the collar on the rod not alone by the wedging action but also by the interlocking of the teeth on the wedge member with the ribs on the rod.

When using the jack as shown in Fig. 4 the clamp 19 is set tightly against the wall 18. Then if it is desired to move the wall 18 toward the left, as may be necessary in plumbing the form, the jack clamping device 21 is brought to the position shown in Fig. 4 and there clamped on the rod in the manner heretofore described. The clamp 19 is then released from the rod, and by means of the handle 25 the outer sleeve 23 is revolved which causes it to move to the left pushing before it the clamp 19 and the wall 18. When the wall 18 and clamp 19 are in the desired position, the clamp is fastened to the rod by driving in its wedge member 3 and the jack clamp 21 with the sleeves 22 and 23 are removed from the rod.

It is to be noted that both the clamping device and jack are self-contained devices in which all of the parts are held together and thus guarded against separation and loss. When used in connection with concrete forms the wedging action and ability easily and quickly to drive the wedge with any required force is very desirable and advantageous. It has been found from tests that a clamp having the size and proportion shown on the drawing will withstand the pull on the rod of six and one-half tons, but it may be loosened from the rod in a few seconds. The force which may be exerted by the jack is only limited by the pressure which will be withstood by the abutting clamp and the threads on the sleeves of the jack.

Having thus described the invention, what is claimed as new, and desired to be secured by Letters Patent, is:

1. A rod clamping device comprising a collar to fit and slide longitudinally on the rod and having a cylindrical aperture extending transversely of and intersecting the central opening of the collar, and a locking wedge shaped member mounted in and rotarily and longitudinally movable in the aperture and having a cylindrical surface fitting the aperture and a flat inclined surface to engage the rod, whereby, when the collar is adjusted to a required position on the rod and the wedge member is driven in, the contacting surfaces of the said member, collar and rod will be forced into frictional engagement and lock the collar in said position and a slight slipping of the rod through the collar will cause the locking member to rotate thereby forcing an edge of the flattened surface into the rod to prevent further slipping of the rod.

2. A rod clamping device for a rod comprising a collar to fit and slide longitudinally on the rod and having a cylindrical aperture extending transversely of and intersecting the central opening of the collar, and a locking wedge shaped member mounted in and rotarily and longitudinally movable in the aperture and having a cylindrical surface fitting the aperture and a flat inclined surface with teeth extending longitudinally thereof to engage the rod, whereby, when the collar is adjusted to a required position on the rod and the wedge member is driven in, the contacting surfaces of the said member, collar and rod will be forced into frictional engagement, and the teeth on the said member will cut into the rod, to retain the collar in said position and a slight slipping of the rod through the collar will cause the locking member to rotate thereby forcing an outer tooth into the rod to prevent further slipping of the rod.

3. A rod clamping device for a rod comprising a collar to fit and slide longitudinally on the rod and having an aperture extending transversely of and intersecting the central opening of the collar, and a locking wedge shaped member with teeth extending longitudinally thereof for engagement with the rod mounted in the aperture for movement therethrough, whereby, when the collar is adjusted to a required position on the rod and the wedge member is driven in, the contacting surfaces of said member, collar and rod will be forced into frictional engagement, and the teeth on said member will cut into the rod to retain the collar in said position, in which the teeth extend at a slight angle to the longitudinal axis of the locking wedge shaped member and a large tooth is presented along one edge.

4. A self-contained rod clamping device comprising a collar to fit and slide longitudinally on the rod, and having a cylindrical aperture extending transversely of and intersecting the central opening of the collar, and a locking wedge shaped member mounted in the aperture with both of its ends projecting beyond the collar, and rotarily and longitudinally movable in said aperture, and having a cylindrical surface fitting the aperture and a flat inclined surface to engage the rod, whereby the collar may be locked in position on the rod by driving in on one projecting end of the wedge member to force the contacting surfaces of the said member, collar and rod, into frictional engagement and a slight slipping of the rod through the collar will cause the locking member to rotate, thereby forcing an edge of the flattened surface into the rod to prevent further slipping of the rod, and the collar may be unlocked by driving in on the other end of the wedge member to release the parts from frictional engagement.

5. A rod clamping device of the type recited in claim 4 having a spring engaging the collar and wedge member and acting to urge the said member into wedging position.

6. A self-contained rod clamping device comprising a collar to fit and slide longitudinally on the rod and having an aperture extending transversely of and intersecting the central opening of the collar, and a locking wedge shaped member retained in the aperture and mounted for movement therethrough and having both of its ends projecting beyond the collar, whereby the collar may be locked in position on the rod by driving in on one projecting end of the wedge member to force the contacting surfaces of the said member, collar and rod, into frictional engagement, and may be unlocked by driving in on the other end of the wedge member to release the parts from frictional engagement, in which the locking wedge shaped member has teeth for engagement with the rod, one of which is a large tooth presented along one edge, all of the teeth extending at a slight angle to the longitudinal axis of the said member.

7. A rod clamping device having the construction defined in claim 1 together with means abutting the collar and extensible along the rod for exerting pressure away from the collar in a direction parallel to the axis of the rod.

In testimony whereof, I have signed my name to this specification.

JOHN F. HENDRICKSON.